March 1, 1949.　　　　R. B. LONG　　　　2,463,189
VEGETABLE SLICER

Filed April 23, 1947　　　　　　　　　　2 Sheets-Sheet 1

INVENTOR.
Roy B. Long
ATTORNEYS

March 1, 1949.    R. B. LONG    2,463,189
VEGETABLE SLICER

Filed April 23, 1947    2 Sheets-Sheet 2

INVENTOR.
ROY B. LONG
BY Victor J. Evans & Co.
ATTORNEYS

Patented Mar. 1, 1949

2,463,189

UNITED STATES PATENT OFFICE 2,463,189

VEGETABLE SLICER

Roy B. Long, Rosewood, Ohio

Application April 23, 1947, Serial No. 743,418

2 Claims. (Cl. 146—160)

My present invention relates to an improved vegetable slicer of the type adapted to slice evenly and with facility such food items as carrots, potatoes and the like.

The invention generally comprises a base, a cutter frame and co-acting guide means on the base and frame so that the cutter blades will be aligned with and will be seated in grooves in the base provided therefor.

In the accompanying drawings I have illustrated one complete example of the physical embodiment of my invention according to the best mode I have thus far devised, but it will be understood that various changes and alterations may be made in the exemplified structure within the scope of the appended claims.

Figure 1:
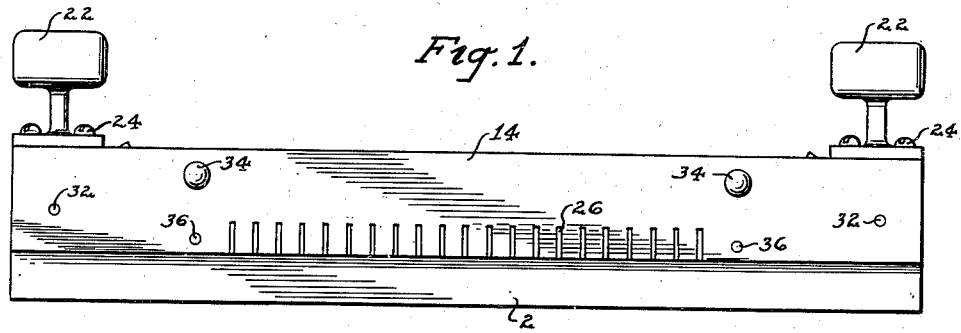
Fig. 1 is a side elevational view of the assembled slicer.
Figure 6:
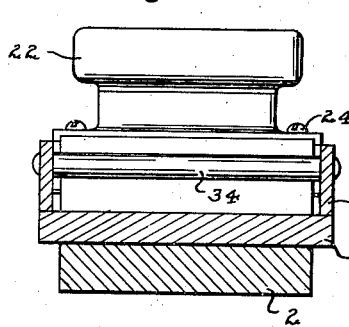
Fig. 6 is a sectional view at line 6—6 of Fig. 2.
Figure 7:
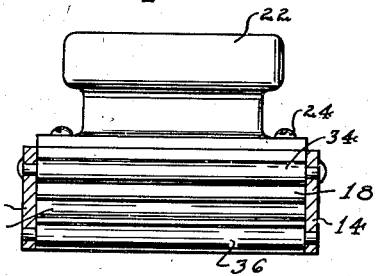
Fig. 7 is a sectional view at line 7—7 of Fig. 4.
Figure 8:
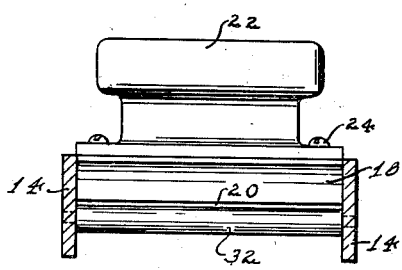
Fig. 8 is a sectional view at line 8—8 of Fig. 4.
Figure 9:
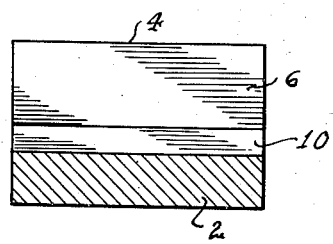
Fig. 9 is a sectional view at line 9—9 of Fig. 5.
Figure 2:
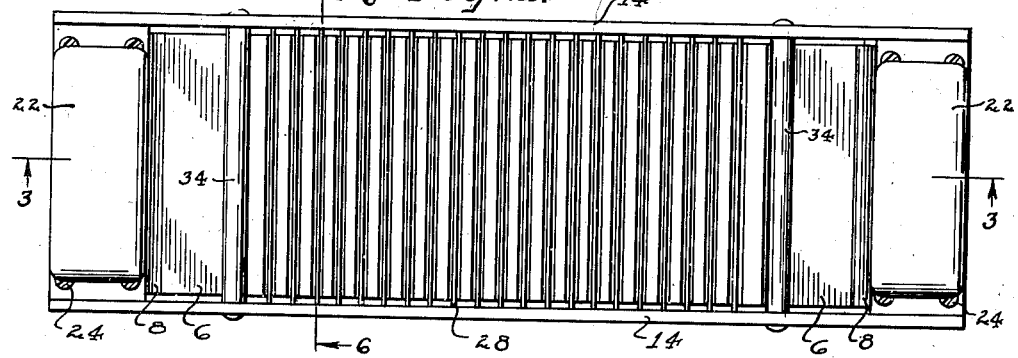
Fig. 2 is a top plan view.
Figure 3:
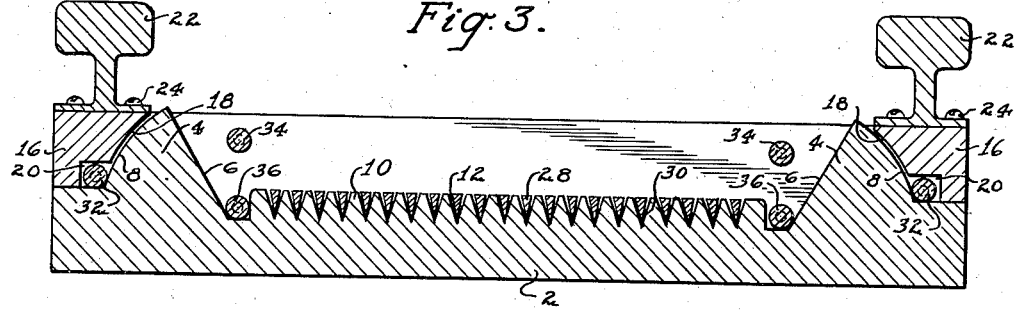
Fig. 3 is a longitudinal sectional view at line 3—3 of Fig. 2.
Figure 4:
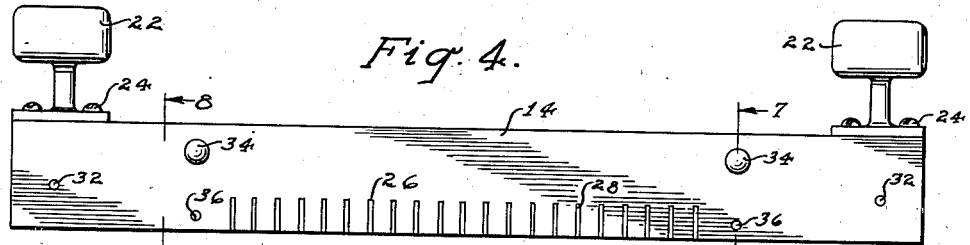
Fig. 4 is a side elevational view of the cutter frame.
Figure 5:
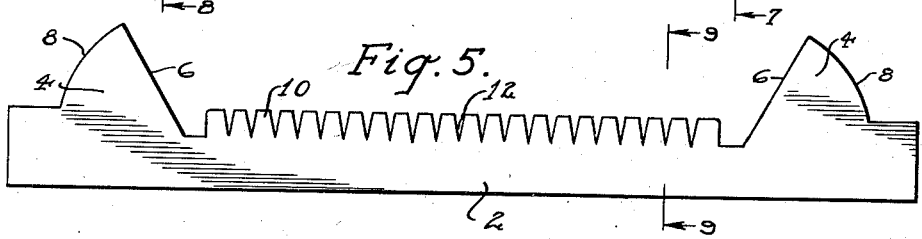
Fig. 5 is a similar view of the base.

Referring now to the drawing I have illustrated the present preferred embodiment of my invention as comprising the horizontally-disposed, elongated base 2 of suitable material not subject to stain formed with abutments 4 which are fashioned with angular or inclined flat faces 6 and arcuate faces 8.

Between the abutments and on the upper surface of the base I have formed a series of transverse ridges 10 the walls of which diverge to form with the adjourning ridges a series of V-grooves 12.

The horizontally-disposed cutter comprises the side bars 14 secured by end frames 16 which are fashioned with depressed arcuate faces 18 and recesses 20. Handles 22 secured by screws 24 are provided to facilitate raising and lowering of the cutter. In notches 26 of the bars 14 I position a series of blades 28 which taper downwardly at 30 and are spaced with the grooves of the base.

Rollers 32 are positioned in the recesses 20 and rollers 34 and 36 are located between the side bars of the cutter.

It will be apparent that with for instance a carrot laid longitudinally upon the ridges of the base, the cutter is located over the base to be pressed thereon. To insure alignment of the blades in the grooves, the rollers 32 will ride down the arcuate faces 8 of the abutment while the rollers 34 will ride down the angular faces 6 of the abutments.

Thus the cutter being pressed down on the carrot will slice therethrough and the blades will come to rest in the V-grooves without contacting the base of the groove protecting the cutting edges.

The slices cut will be prevented by the ridges from descending with the blades and will be available within the cutter above the sunken blades for easy removal.

The slicer of my invention will be useful in homes and restaurants in saving time and labor and at the same time effectively and quickly slicing vegetables for consumption.

Having thus fully described my invention what I claim as new and desire to secure by Letters Patent is:

1. In a vegetable slicer, a horizontally-disposed elongated base provided with a plurality of spaced parallel grooves defining ridges therebetween for the support thereon of a vegetable to be sliced, an abutment secured to each end of said base and projecting upwardly from the latter, each of said abutments being provided with an arcuate face and an inclined flat face, a horizontally-disposed cutter mounted for movement toward and away from said base, said cutter comprising a pair of side bars arranged in spaced, parallel relation with respect to each other, a frame arranged adjacent each of the ends of said side bars and secured to the latter, each of said frames being provided with an arcuate face, a first roller carried by each of said frames, a pair of rollers spaced from each of said frames and secured to said side bars, the rollers and the arcuate face of said cutter coacting with the complemental flat and arcuate faces of said abutment for guiding said cutter onto said base, and a plurality of spaced, parallel blades extending between said side bars and secured thereto for slicing said vegetable and registering with the grooves in said base upon movement of the cutter toward the base.

2. In a vegetable slicer, a horizontally-disposed elongated base provided with a plurality of spaced parallel V-shaped grooves defining ridges therebetween for the support thereon of a vegetable to be sliced, an abutment secured to each end of said base and projecting upwardly from the latter, each of said abutments being provided with an arcuate face and an inclined flat face, a horizontally-disposed cutter mounted for movement toward and away from said base, said cutter comprising a pair of side bars arranged in spaced relation with respect to each other, a frame arranged adjacent each of the ends of said side bars and secured to the latter, each of said frames being provided with an arcuate face, a first roller carried by each of said frames, a pair of rollers spaced from each of said frames and secured to said side bars, the rollers and the arcuate face of said cutter coacting with the complemental flat and arcuate faces of said abutment for guiding said cutter onto said base, and a plurality of downwardly-tapered spaced parallel blades extending between said side bars and secured thereto for slicing said vegetable and registering with the V-shaped grooves in said base upon movement of the cutter toward the base.

ROY B. LONG.

REFERENCES CITED

The following references are of record in the file of this patent:

UNITED STATES PATENTS

| Number | Name | Date |
|---|---|---|
| 944,087 | Glockler et al. | Dec. 21, 1909 |
| 1,097,479 | Starr | May 19, 1914 |
| 1,234,724 | Broomfield | July 31, 1917 |
| 1,431,310 | Knaus | Oct. 10, 1922 |
| 1,685,700 | Kulenkampff | Sept. 25, 1928 |

FOREIGN PATENTS

| Number | Country | Date |
|---|---|---|
| 8,947 | Great Britain | May 11, 1892 |